United States Patent [19]

Boorse et al.

[11] 3,960,468
[45] June 1, 1976

[54] FLUID LUBRICATED BEARING ASSEMBLY

[75] Inventors: Henry A. Boorse, Leonia, N.J.; Gilbert F. Boeker; John R. Menke, both of New York, N.Y.

[73] Assignee: The United States of America as represented by the United States Energy Research and Development Administration, Washington, D.C.

[22] Filed: July 16, 1946

[21] Appl. No.: 683,871

[52] U.S. Cl. .................... 417/424; 308/9; 308/160; 308/DIG. 1; 415/104
[51] Int. Cl.² ............................ F04B 17/00
[58] Field of Search ............ 308/9, 134.1, 160, 168, 308/170, 172; 230/117; 417/423, 424, DIG. 1; 415/104

[56] References Cited
UNITED STATES PATENTS

| | | | |
|---|---|---|---|
| 1,331,108 | 2/1920 | Howarth | 308/160 |
| 1,520,356 | 12/1924 | Lawaczeck | 308/9 |
| 1,898,659 | 2/1933 | Gaidener | 308/172 |
| 1,974,678 | 9/1954 | Lafont | 103/87 |
| 2,319,730 | 5/1943 | Garraway | 417/356 |
| 2,362,667 | 11/1944 | Schmidt | 308/160 |
| 2,406,947 | 9/1946 | Harlamoff | 415/111 |
| 2,531,098 | 11/1950 | Anderson | 230/117 |

FOREIGN PATENTS OR APPLICATIONS

| | | | |
|---|---|---|---|
| 745,140 | 2/1933 | France | 230/117 |
| 159,569 | 2/1921 | United Kingdom | 308/9 |

Primary Examiner—Samuel W. Engle
Assistant Examiner—Harold Tudor
Attorney, Agent, or Firm—Dean E. Carlson; Leonard Belkin

EXEMPLARY CLAIM

1. A support for a loaded rotatable shaft comprising in combination on a housing having a fluid-tight cavity encasing an end portion of said shaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, and means for supplying a fluid lubricant to said thrust bearing, said thrust bearing having a lubricant-conducting path connecting said lubricant supplying means with the space between said thrust plate and collar intermediate the peripheries thereof, the surfaces of said plate and collar being constructed and arranged to inhibit radial flow of lubricant and, on rotation of said thrust collar, to draw lubricant through said path between the bearing surfaces and to increase the pressure therebetween and in said cavity and thereby exert a supporting force on said end portion of said shaft.

13 Claims, 4 Drawing Figures

INVENTORS
HENRY A. BOORSE
GILBERT F. BOEKER
JOHN R. MENKE
BY
ATTORNEY

Fig. 4

FLUID LUBRICATED BEARING ASSEMBLY

This invention relates to apparatus for supporting a loaded, rotatable shaft such as the shaft of a centrifugal pump, centrifuge, blower, refrigerant compressor, rotary drill, or the like. More particularly, the invention relates to a novel type of motor housing and bearing assembly for such a shaft wherein thrust and journal bearings are so arranged as to permit more effective use of the bearing surfaces and more effective use of a fluid lubricant to lubricate the bearing surfaces and otherwise support the load. The housing of the present invention may be employed with particular advantage where the nature of the load on the shaft is such that the use of a gaseous lubricant to lubricate the bearings within the housing is either desirable or mandatory. However, as the description proceeds, it will be apparent that the assembly can also be used with other types of fluid lubricants such as oil or water.

As conducive to a clearer understanding of the present invention, it may be pointed out that conventional oil-lubricated bearings are subject to a number of disadvantages and limitations that militate against their use in certain special situations. Thus, for example, where oil-lubricated bearings are incorporated in a pump or compressor to be used in handling corrosive gases, the corrosive gas may be of such a character that it reacts chemically with the oil and destroys its lubricating properties. Furthermore, the gas may become contaminated either with the oil lubricant or its vapors or with the products of the reaction between the corrosive gas and the lubricant. The use of seals to prevent intermingling of the corrosive gas and oil is frequently unsatisfactory because of the difficulty of maintaining the seal gas-tight in the presence of the corrosive gas. On the other hand, if the bearing is so constructed that it may be used with a gaseous lubricant, the gas being handled can itself be used as lubricant, thus eliminating the necessity for addition of lubricant from an outside source and making it possible to hermetically seal the pump or compressor with respect to the surrounding atmosphere. It is thus apparent that gas-lubricated bearings possess a substantial advantage when used in equipment for handling highly corrosive gases.

For the same or similar reasons gas lubrication may be used with advantage in other situations such as where the gas being pumped, although non-corrosive, must be maintained free from contamination with foreign materials or in cases where it is desirable to preclude the possibility of leakage of the gas being pumped such as where the gas is poisonous or otherwise objectionable, or unusually valuable.

Other advantages of using a gaseous lubricant arise out of the fact that the viscosities of gases are, in general, substantially less than the viscosities of liquids and increase with increasing temperatures. Since the viscosity of a gas is usually less than that of a liquid lubricant such as oil, frictional effects can be substantially reduced by substituting gas-lubricated bearings for oil-lubricated bearings and a corresponding reduction in the power input required to overcome such frictional effects can be achieved. Furthermore, the increase in viscosity with increasing temperature that is characteristic of gases constitutes a safety factor in the operation of gas-lubricated bearings. In the case of an oil-lubricated bearing an increase in the temperature of the bearing increases the probability that the bearing will fail, whereas with a gas-lubricated bearing the reverse is true. For this reason, among others, it is the usual practice to design a gas-lubricated bearing with a smaller factor of safety than would be required in the case of an oil-lubricated bearing.

In spite of these clear advantages of the gas-lubricated bearing, such bearings have not been used to any appreciable extent commercially because the bearings previously used could support only relatively light loads. The present invention provides a housing and bearing assembly that may be lubricated entirely by gas to attain the advantages described above and is capable of supporting a shaft carrying substantially greater loads.

It is an object of the present invention to provide an improved type of motor housing and bearing assembly for supporting a loaded, rotatable shaft.

It is a further object of the invention to provide such an assembly wherein the bearings may be lubricated entirely by gas.

It is another object of the invention to provide an assembly of the above character including a thrust bearing and one or more journal bearings wherein the thrust bearing operates as a pump to supply lubricant under increased pressure to the journal bearing or bearings.

It is another object of the invention to provide a motor housing and gas-lubricated bearing assembly capable of supporting heavier loads than hitherto has been possible.

It is still another object of the invention to provide an improved motor blower construction incorporating gas-lubricated bearings.

It is a still further object of the invention to provide an improved motor blower construction for handling a corrosive gas wherein the corrosive gas may itself be used to lubricate the bearings of the motor blower.

It is another object of the invention to provide an improved motor blower construction for handling gases in such manner that they may be pumped without being contaminated by added lubricants.

Other objects of the invention will be in part obvious and in part pointed out hereinafter.

The many objects and advantages of the present invention may best be appreciated by referring to the accompanying drawings which illustrate a motor blower unit incorporating a preferred embodiment and a modification of the motor housing and bearing assembly of the present invention and wherein.

Figure 1:
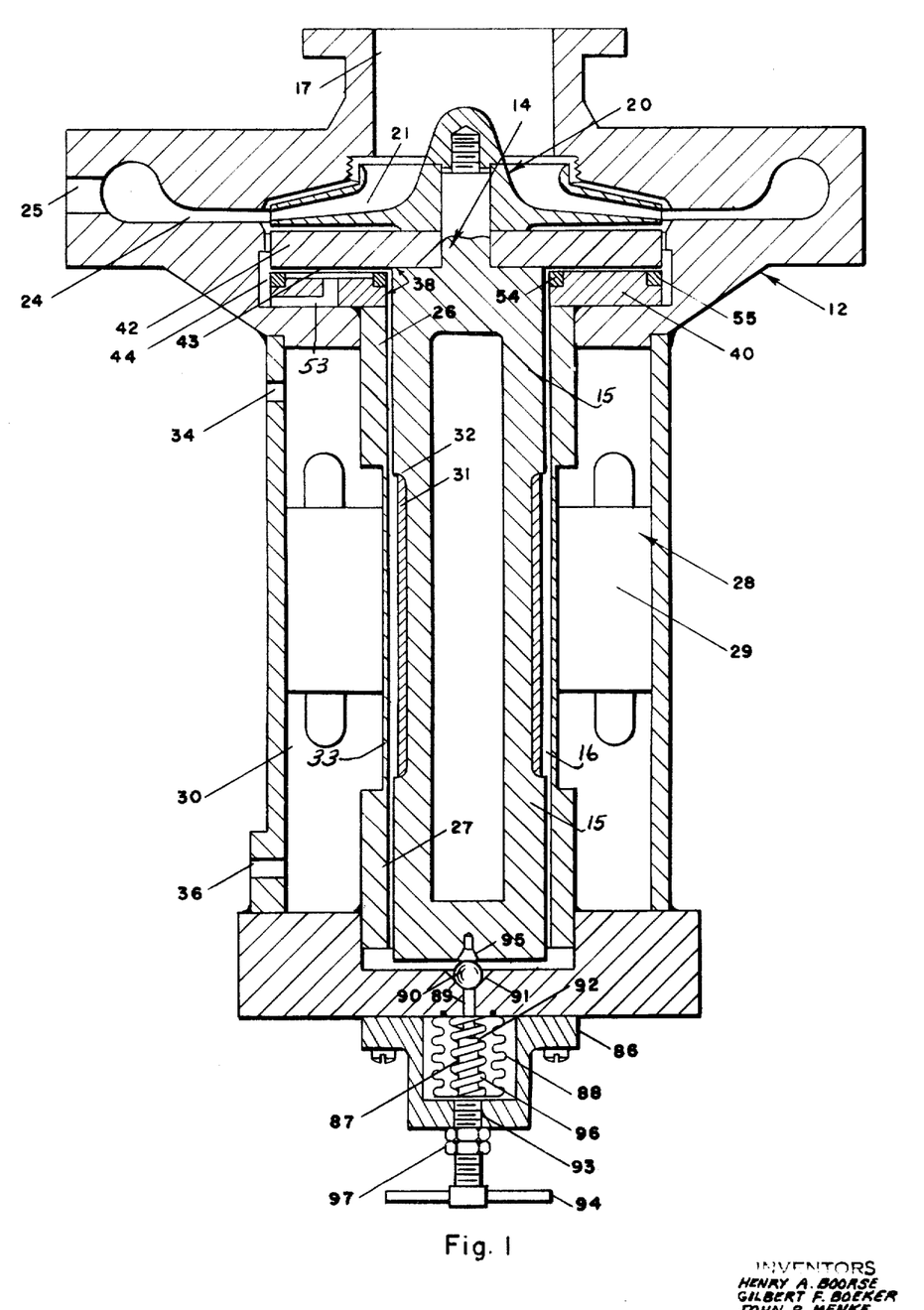
FIG. 1 is a vertical axial section of a hermetically sealed, electrically driven motor blower unit.

Referring to the drawings and particularly to FIG. 1, the motor blower unit or centrifugal compressor there shown comprises a sealed, gas-tight housing or casing 12 and a rotor 14 that rotates about a vertical axis. The rotor 14 comprises a holow vertical shaft 15 located in and encased by a well or cavity 16 of the housing 12; a thrust collar or bearing plate 42 which forms part of a thrust bearing 38 and has a plane annular bearing surface 43 on its underside; and an impeller 20 mounted on the shaft 15 and located in the upper part of housing 12. The term, thrust bearing, as used in the present specification and claims comprehends both the stationary and the movable portions of the bearing. The gas to be compressed is drawn centrally into the top of the housing through a flanged inlet 17 and flows through impeller vane 21 to a discharge passage 24 and then leaves the housing through conduit 25. The rotating impeller 20 cooperates with the passage 24 to compress and pump the gas flowing therethrough.

The rotor 14 receives its principal vertical support from the gas-lubricated thrust bearing 38 and is laterally guided by journal bearings 26 and 27 near the top and bottom respectively of the shaft portion 15 of the rotor.

In the lower part of housing 12 an electric motor 28, preferably an induction motor, is provided for driving the rotor 14. The motor comprises a stator 29 having the customary field windings and located in an annular compartment 30 of the housing and a cylindrical armature 31 mounted in a cut-out portion 32 of the shaft 15. Two openings 34 and 36 are provided in compartment 30 to permit circulation of a cooling fluid therethrough to cool the field windings of the motor.

A thin wall or diaphragm 33 is provided between the armature 31 and stator 29 to seal the interior of the housing and prevent the gas being pumped from coming in contact with the field windings of the stator. The diaphragm 33 may be made of any metal having a high electrical resistance such as Monel or nichrome metal, or may be made of a sutiably attached non-conductor. In cases where the gas being pumped is noncorrosive and there is thus no need to protect the stator or windings from the gas being pumped, it will usually be desirable to omit the diaphragm 33. Where, on the other hand, the gas being pumped is corrosive, the diaphragm prevents the gas from coming in contact with the stator, and the armature as well as other parts of the rotor may be made of a corrosion resistant material so that there will be no danger of damage to the motor or other parts of the unit due to the corrosive action of the gas.

Figure 2:
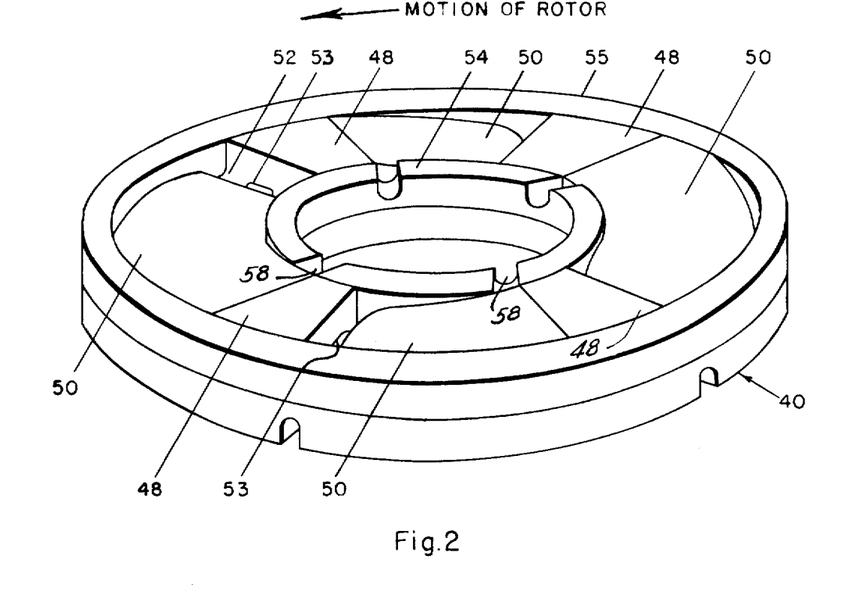
FIG. 2 is an enlarged perspective view of the thrust plate of the blower of FIG. 1.

As pointed out above, the rotor 14 and impeller 20 are supported on a thrust bearing 38 comprising the thrust collar 42 which is secured to shaft 15 to rotate therewith and has a plane horizontal bearing surface 43, and a stationary annular thrust plate 40 that is fixed to the housing 12 and is provided with recessed bearing surfaces as best shown in FIG. 2. Referring to FIG. 2, the thrust plate comprises a plurality of flat bearing surfaces 48 with a plurality of inclined bearing surfaces 50 therebetween. The angle of inclination of the sloping bearing surfaces 50 is preferably very small and may be such that the lower edge of the sloping surface is only a few thousandths of an inch below the upper edge of the sloping surface. The angle of slope is exaggerated in the drawings.

At the lower edge of each sloping surface 50 there is a channel 52 into which opens a lubricant supply duct 53 for a gaseous lubricant. In the present embodiment the lubricant is the gas being pumped. Referring again to FIG. 1, a portion of the gas flowing through the compressor discharge passage 24 is diverted and flows downwardly through a lubricant supply conduit 44 to the supply ducts 53. The ducts 53 extend radially inward through the lower portion of the thrust plate 40 to a point between the inner and outer periphery of the annular thrust plate 40 and then upwardly into the channels 52. The lubricant gas flows through the ducts 53 and then upwardly over the inclined surfaces 50.

To limit the escape of gas at the sides of the inclined bearing surfaces 50 and thus retain a higher pressure between the inclined surfaces and the plane bearing surface 43, a pair of retaining walls are provided comprising an inner ring 54 and an outer ring 55. The tops of the inner and outer rings are flush with the horizontal bearing surfaces 48 and the top edge of the sloping bearing surfaces 50. A plurality of channels 58 are provided in the inner ring through which the gas may flow in leaving the inclined bearing surfaces near the top edge of such surfaces. As shown in FIG. 2, the channels 58 are preferably arranged at such an angle with respect to the radius of ring 54 as to facilitate flow of gas from the surfaces 50 into and through the channels. That is to say, the channels 58 are pointed in the same general direction as the movement of the gas.

In order to reduce the starting torque when the compressor is placed into operation, means are provided near the bottom of the casing 12 for temporarily supporting the rotor 14 during the starting period. Referring again to FIG. 1, there is provided at the bottom of the casing 12 a housing 86 containing a plunger 87 which is encased in a flexible metal bellows 88 sealed to the casing 12. The plunger 87 has an extension 89 of reduced diameter that passes through the casing 12 into contact with a ball bearing 90 which normally rests in a conical recess 91 in the interior of casing 12. The shoulder 92 of plunger 87 limits upward movement of the plunger.

The bellows 88 is provided with a relatively stiff internal spring 96 which tends to keep the bellows distended. The bellows may be compressed and the plunger 87 moved upwardly by rotation of a screw 93 which is threaded into the bottom of housing 86 and is provided with a handle 94. The construction is such that the screw 93 may be rotated to move the plunger 87 upwardly and force ball bearing 90 against a conical bearing surface 95 at the bottom of rotor 14. In this way the rotor may be lifted and the starting torque on motor 28 reduced.

When the rotor has attained a sufficient speed to cause the gas pressure in thrust bearing 38 to build up to the point at which the load can be carried by the thrust bearing, the plunger 87 is lowered and thereafter the weight of the rotor 14 is carried by the thrust bearing 38. The lock nuts 97 are provided to maintain the screw 93 and plunger 87 in fixed position except when the plunger is being raised or lowered.

The operation of the above described apparatus is as follows: The arrow in FIG. 2 indicates the direction of rotation of the rotor 14 and thrust collar 42. As the impeller or compressor 20 is placed into operation, the rotation of the thrust collar 42 with respect to thrust plate 40 draws gas through the ducts 53 and up over the sloping bearing surfaces 50. Because of the inclination of the bearing surfaces there is a wedging action which tends to produce an increase in the pressure of the gas between the bearing surfaces 50 and the bearing surface 43. The compressed gas forms a pneumatic cushion upon which the thrust collar 42 and rotor 14 ride. The retaining rings 54 and 55 inhibit escape of gas at the sides of the inclined surfaces and substantially increase the pressure and consequently the supporting capacity of the bearing.

When the gas reaches the top of the sloping surfaces 50, it is distributed in such a way that a portion flows through the channels 58 and down into the well 16, a second portion flows across the horizontal bearing surfaces 48 in an arcuate path to the next sloping surface 50, and a third portion of the gas escapes over the top of outer ring 55. The gas flowing into well 16 tends to increase the pressure in the well and thus the thrust bearing 38 in effect operates as a pump to pump up the space between the well 16 and shaft 15. The relatively high pressure thus produced within the well results in several advantages. It causes the bottom of shaft 15 to form a supplemental thrust surface which assists the bearing 38 in supporting the rotor, thereby substantially increasing the useful load that may be carried. Thus, the thrust collar 42 ad shaft 15 may be considered as one bearing member and the thrust plate 40 and well 16 as another bearing member.

There is some tendency for the shaft 15 to heat up due to eddy currents in the armature 31. The increased pressure in the well 16 increases the density of the gas therein and hence facilitates dissipation of such heat by convection. It also provides relatively high pressure lubricant gas to lubricate the journal bearings 26 and 27, thereby increasing the bulk modulus of elasticity of the gas, improving the operation of the journal bearings and increasing their efficiency.

When the compressor gets up to its normal operating speed, an equilibrium condition is reached such that little, if any, gas flows through the channels 58. Gas which escapes over the top of outer ring 55 is recirculated through passage 44 and ducts 53, and a sufficient gas pressure is maintained between the bearing surfaces 43 and 48 to provide a continuous film of gaseous lubricant between the surfaces 43 and 48 and prevent any metal to metal contact.

It is apparent that the dimensions of the thrust plate shown in FIG. 2 may be varied considerably. One thrust plate that gave satisfactory results when tested had the following characteristics. The thrust plate had an overall diameter of 8½ inches and was provided with six inclined bearing surfaces 50 and six flat bearing surfaces 48. The sloping surfaces 50 were made about five times as long as the flat surfaces and thus the arcs bounding the sloping surfaces subtended central angles of about 50° and the arcs bounding the flat bearing surface subtended central angles of about 10°. The bearing surfaces were of about 2 inches radial width, the retaining rings ¼ inch. wide, and the central opening in the thrust plate 3½ inches, in diameter. The slope of the inclined surfaces was 0.001 radian. It is, of course, to be understood that the foregoing details are illustrative only and are included only to give an indication of the relative proportions of the various parts that resulted in an operative structure.

In testing the bearing described above, it was found that a substantial increase in pressure could be obtained in the cavity or well 16 and that this increase in pressure was particularly significant at relatively low ambient pressures. Thus, for example, with a lubricant supply pressure of 2 pounds per square inch absolute and a speed of 6150 r.p.m., the pressure in the well 16 was about 70% higher than the lubricant supply pressure. Under these circumstances the increase in pressure obtained within the well very materially increased the total load that the housing and bearing could carry.

Figure 3:
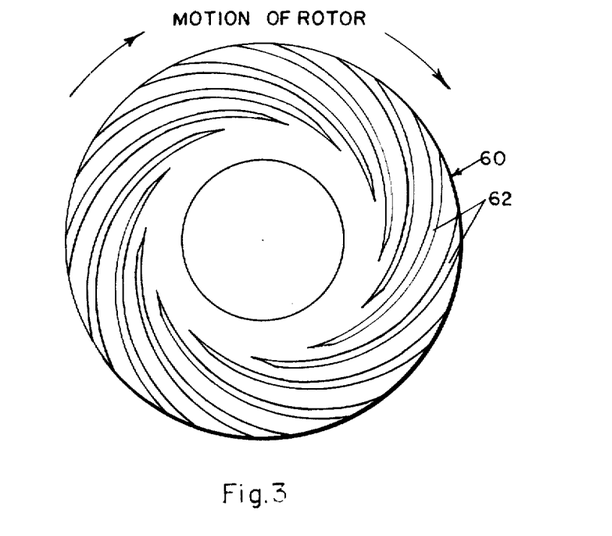
FIG. 3 is a top plan view of an alternative form of thrust plate.

Referring now to FIG. 3 of the drawings, a somewhat different type of thrust plate 60 is shown in this figure. The upper surface of thrust plate 60 is provided with a number of recesses in the form of shallow spiral grooves 62 curving inwardly from the periphery of the thrust plate to a point intermediate between the inner and outer edges of the thrust plate. The motion of the rotor with respect to the thrust plate 60 is indicated by the arrow. As the rotor rotates, the plane surface of thrust collar 42 causes gas to be drawn into and through the spiral grooves 62 to form a gas film between the upper or bearing surface of thrust plate 60 and the surface 43 of collar 42. The gas is compressed to a sufficient extent within the grooves to produce a gas film between the bearing surfaces under a sufficient pressure to support the weight of the rotor and load.

It is apparent that the number, size and shape of the grooves in thrust plate 60 may be varied. The structure shown in FIG. 3 is a representation of a thrust plate that gave satisfactory results when tested. This thrust plate had an overall diameter of 8½ inches and was provided with 12 spiral grooves of the configuration shown in FIG. 3. The grooves were approximately 0.0025 inch in depth. The depth, width, and number of the grooves 62 varies with such factors as the size of the bearing, the load it is to carry, the running clearance, and the speed of rotation. In general, if a larger number of grooves is provided or the grooves are made wider, the load carrying capacity of the bearing will be increased for a given rotational speed and running clearance provided, of course, that the total groove area is not made so large as to result in excessive radial leakage from the grooves.

As in the case of the thrust plate 40, the thrust plate 60 was found to produce a substantial increase in pressure in the well 16 which is most significant at relatively low ambient or lubricant supply pressures. At a speed of 6150 r.p.m. ad an absolute lubricant supply pressure of 2 pounds per square inch, for example, an increase in pressure of approximately 100% is obtained within the well 16 with a running clearance of 0.001 inch.

It is usually desirable that the depth of the grooves be such as to give a maximum flow of gaseous lubricant across the bearing surfaces. If the grooves are made too deep, movement of the bearing surface 43 with respect to thrust plate 60 will not draw sufficient quantity of gaseous lubricant through the grooves. If, on the other hand, the grooves are made too shallow, the cross-sectional area of the groove is so small that an insufficient quantity of gas flows therethrough. It has been found that a satisfactory flow of lubricant can be obtained in most cases by using grooves having a depth of the order of 0.001 to 0.005 inch. In the structure shown in FIG. 3 the grooves extend nearly to the inner rim of the annular bearing surface but it is obvious that the point at which the grooves terminate may be varied to obtain the desired operating characteristics.

Figure 4:
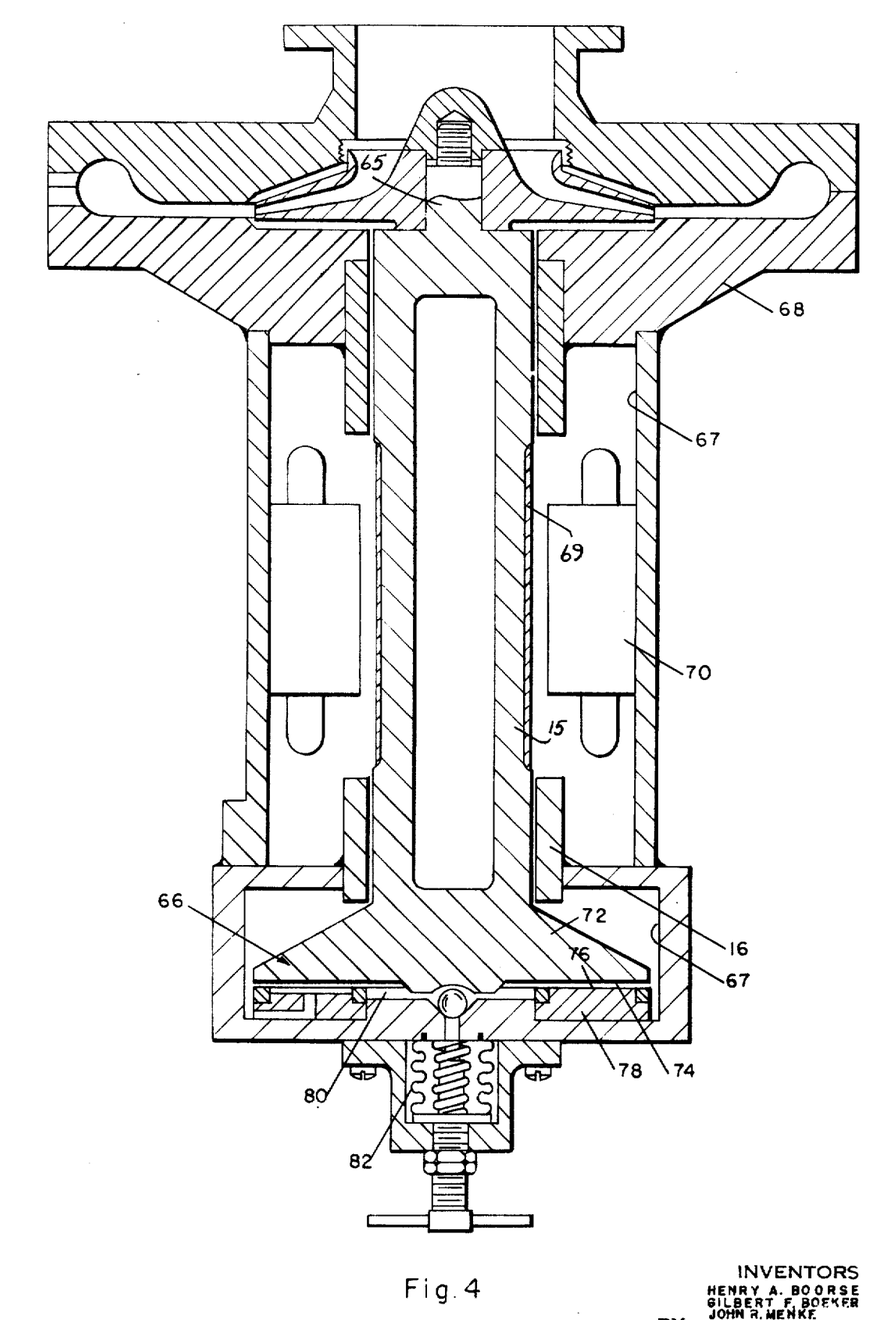
FIG. 4 is a vertical axial section of a modified construction of the hermetically sealed motor blower unit of FIG. 1 wherein the thrust bearing is located at the bottom of the casing instead of near the top of the casing as in FIG. 1.

Referring now to FIG. 4 of the drawings, an alternative embodiment is shown which is generally similar in construction to the blower of FIG. 1. In FIG. 4, however, the axial thrust of rotor 65 is carried by a thrust bearing 66 located near the bottom of well 67 in housing 68. The diaphragm 33 and openings 34 and 36 of FIG. 1 are omitted and thus both the armature 69 and stator 70 of the motor are located within well 67.

The thrust bearing 66 comprises a rotatable plate 72 supporting the rotor 65 and having a plane bearing surface 74 cooperating with the bearing surface 76 of a thrust plate 78 which is constructed similarly to the thrust plate 40 of FIG. 1. The rotatable plate 72 and thrust plate 78 cooperate to define with bellows 82 a substantially completely closed central cavity or pocket 80 which communicates with the space between the bearing surfaces 74 and 76. The bearing surfaces of rotatable plate 72 and thrust plate 78 cooperate in the manner described in connection with FIG. 1 to increase the pressure in the cavity 80 in such manner that the cavity operates as a supplemental bearing to assist the thrust bearing surfaces 74 and 76 in supporting the weight of the rotor.

It is evident that the cavity 80 is substantially smaller than the well or cavity 16 of the embodiment of FIG. 1. Under some circumstances the relatively large volume of the well of cavity 16 of FIG. 1 is an advantage in that it results in more stable operation of the blower.

From the above description it is apparent that the motor housing and bearing assembly of the present invention comprises an unusually compact and efficient structure for achieving the several objects set forth above. The arrangement of the thrust and journal bearings within the sealed housing permits the thrust bearing to be used as a pump to supply lubricant under increased pressure to a central well or cavity and to the journal bearings, thereby increasing the useful load that may be supported by the assembly and improving the operation of the journal bearings. Where the housing and bearing assembly is incorporated in a motor blower unit, a part of the gas being pumped may be used as a lubricant and thus the structure may be incorporated in apparatus for handling corrosive gases or gases which must be maintained free from contamination with particular advantage as described previously.

It is, of course, to be understood that the invention is not limited to the specific construction shown in the drawings. Although the housing and bearing assembly has been shown as incorporated in a motor blower unit operating in a vertical position, it is apparent that the assembly may be used to support a shaft carrying other types of loads and rotatable about an axis other than a vertical axis. The thrust plate may be recessed in other ways than indicated in FIGS. 2 and 3. The apparatus of the present invention is not limited to any particular construction of thrust and journal bearings and it is only necessary that the thrust bearing used be capable of establishing a lubricant pressure that is transmitted to a central cavity or well and that this central cavity or well be so completely enclosed by the thrust bearing members that the pressure within the cavity is at all points higher than the lubricant supply pressure. In FIG. 1 the surface 43 is shown as a plane surface but it is evident that other types of plain or nonrecessed surfaces such as spherical or conical surfaces might be used. In such cases the recessed surface of thrust plate 40 would be generally shaped to conform with the plain surface.

The starting torque may be reduced in other ways than by the mechanism described above. Thus, a pneumatic lift may be used, that is, a gas from an outside source may be pumped into the bottom of the well 16 to lift the rotor until it has come up to speed.

In the embodiments shown in the drawings the stationary portion of the thrust bearing is recessed. However, it is evident that the surface of the rotatable member may be recessed or, if desired, both of the surfaces may be recessed. Other variations within the scope of the invention will be apparent to those skilled in the art.

Since many embodiments can be made of the present invention and since many changes can be made in the embodiment described above, it is to be understood that the above description is to be interpreted as illustrative only and not in a limiting sense.

We claim:

1. A support for a loaded rotatable shaft comprising in combination a housing having a fluid-tight cavity encasing an end portion of said shaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, and means for supplying a fluid lubricant to said thrust bearing, said thrust bearing having a lubricant-conducting path connecting said lubricant supplying means with the space between said thrust plate and collar intermediate the peripheries thereof, the surfaces of said plate and collar being constructed and arranged to inhibit radical flow of lubricant and, on rotation of said thrust collar, to draw lubricant through said path between the bearing surfaces and to increase the pressure therebetween and in said cavity and thereby exert a supporting force on said end portion of said shaft.

2. A support for a loaded rotatable shaft comprising in combination a housing having a fluid-tight cavity encasing an end portion of said shaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, a journal bearing within said cavity for supporting the radial load of said shaft, and means for supplying a fluid lubricant to said thrust bearing, said thrust bearing having a lubricant-conducting path connecting said lubricant supplying means with the space between said thrust plate and collar intermediate the peripheries thereof, the surface of said place collar being constructed and arranged to inhibit radial flow of lubricant and, on rotation of said thrust collar, to draw lubricant through said path between the bearing surfaces and to increase the pressure therebetween and in said cavity and thereby exert a supporting force on said end portion of said shaft and supply lubricant under increased pressure to said journal bearing.

3. A support for a loaded rotatable shaft comprising in combination a housing having a fluid-tight cavity encasing an end portion of said shaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, a pair of journal bearings located within said cavity at spaced points along said shaft for supporting the radial load of said shaft, and means for supplying a fluid lubricant to said thrust bearing, said thrust bearing having a lubricant-conducting path connecting said lubricant supplying means with the space between said thrust plate and collar intermediate the peripheries thereof, the surfaces of said plate, and collar being constructed and arranged to inhibit radical flow of lubricant and, on rotation of said thrust collar, to draw lubricant through said path between the bearing surfaces and to increase the pressure therebetween and in said cavity and thereby exert a supporting force on the end portion of said shaft and supply lubricant under increased pressure to said journal bearings.

4. A support for a loaded rotatable shaft comprising in combination a housing having a fluid-tight encasing an end portion of said shhaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, a plurality of journal bearings located within said cavity at spaced points along said shaft for supporting the radial load of said shaft, motor means operable to apply a driving torque to said shaft at a point within said cavity, and means for supplying a fluid lubricant to said thrust bearing, said thrust bearing having a lubricant-conducting path connecting said lubricant supplying means with the space between sad thrust plate and collar intermediate the peripheries thereof, the surfaces of said plate and collar being constructed and arranged to inhibit radial flow of lubricant and, on rotation of said thrust collar, to draw lubricant through said path between the bearing surfaces and to increase the pressure therebetween and in said cavity and thereby exert a force on said end portion of said shaft and supply lubricant under increased pressure to said journal bearings.

5. A support for a loaded rotatable shaft comprising in combination a housing having a fluid-tight well encasing an end portion of said shaft, a thrust bearing near the open end of said well for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said well, a pair of journal bearings located within said well at spaced points along said shaft for supporting the radial load of said shaft, means formed in said housing for supplying a fluid lubricant to said thrust bearing, and electric motor means operable to apply a driving torque to said shaft to drive the same at a point between said journal bearings, said motor means comprising an armature mounted on said shaft and an electrical field element mounted in said housing, said thrust bearing having a lubricant-conducting path connecting said lubricant supplying means with the space between the thrust plate and thrust collar and being constructed and arranged to inhibit radial flow of lubricant, and on rotation of said thrust collar to draw lubricant through said path between the confronting bearing surfaces and to increase the pressure between said bearing surfaces and in said well and thereby exert an axial supporting force on said end portion of said shaft and supply lubricant under increased pressure to said journal bearings.

6. A support for a loaded rotatable shaft comprising in combination a housing having a fluid-tight cavity encasing an end portion of said shaft, a thrust bearing near the open end of said cavity for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said cavity, a pair of journal bearings located within said cavity at spaced points along said shaft for supporting the radial load of said shaft, means for supplying a fluid lubricant to said thrust bearing, and electric motor means operable to apply a driving torque to said shaft at a point within said cavity, said motor means comprising an armature mounted on aid shaft and an electrical field element surrounding said armature and mounted in said housing, said armature and said field element cooperating to rotate said shaft, and said thrust bearing having a lubricant-conducting path connecting said lubricant supplying means with the space between the thrust plate and the thrust collar intermediate the peripheries thereof, the surface of said plate and collar being constructed and arranged to inhibit radial lubricant flow and, on rotation of said thrust collar, to draw lubricant through said path between the bearing surfaces and to increase the pressure therebetween and in said cavity and thereby exert a supporting force on said end portion of said shaft and supply lubricant under increased pressure to said journal bearings.

7. In apparatus for supporting the axial thrust of a loaded rotatable shaft, in combintion, a first bearing member mounted on said shaft and having a plane bearing surface, a second bearing member including means forming a central fluid-tight cavity and an annular thrust plate surrounding the open end of said cavity, said thrust plate having a recessed bearing surface confronting the plane bearing surface of said first bearing member, means for supplying a fluid lubricant to said bearing surfaces, said second bearing member having a lubricant-conducting path within it connecting said lubricant supplying means with a position between the confronting bearing surfaces, said recessed bearing surface having peripheral non-recessed portions adapted to inhibit radial flow of lubricant and means for rotating said shaft and said first bearing member to cause said lubricant to be drawn between said bearing surfaces, said recessed bearing surface being so recessed that on rotation of said shaft, lubricant is drawn through said path between the confronting bearing surfaces, said recessed and non-recessed portions cooperating to increase the pressure between the bearing surfaces and to maintain the entire inner periphery of said annular thrust plate at a pressure higher than the lubricant supply pressure, whereby said cavity operates effectively as a supplemental bearing to assist said plane and recessed bearing surfaces in supporting the axial thrust of said shaft.

8. In apparatus for supporting the axial thrust of a loaded rotatable shaft, in combination, a first bearing member mounted on said shaft and having a plane bearing surface, a second bearing member having a recessed bearing surface confronting said plane bearing surface, said two bearing members cooperating to define a central fluid-tight cavity communication with the space between said plane and recessed bearing surfaces and said recessed bearing surface being provided with a plurality of recesses spaced from said cavity, means for supplying a fluid lubricant to said recesses, said second bearing member having a lubricant-conducting path connecting said lubricant-supplying means with space between the confronting bearing surfaces intermediate their pheripheries, said recessed bearing surface having peripheral non-recessed portions adapted to inhibit radial flow of lubricant and means for rotating said shaft and first bearing member to cause said lubricant to be drawn between said bearing surfaces and there to increase the lubricant pressure, said recessed and non-recessed portions cooperating, on rotation of the shaft to increase the pressure between said bearing surfaces and in said cavity, said cavity being enclosed by said bearing members to such an extent that it communicates with the space between said plane and recesed bearing surfaces only at points where the lubricant pressure is higher than the lubricant supply pressure, whereby said cavity operates effectively as a supplemental bearing to assist said plane and recessed bearing surfaces in supporting the axial trust of said shaft.

9. In a hermetically sealed motor pump unit for pumping a fluid, in combination, a rotor comprising an impeller and an elongated shaft, a sealed housing enclosing said rotor and having a fluid-tight well encasing said shaft, a thrust bearing near the open end of said well for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said well, a pair of journal bearings located within said well at spaced points along said shaft for supporting the radial load of said shaft, means for supplying a lubricant to said thrust bearing, and motor means operable to apply a driving torque to said shaft at a point within said well to cause said shaft to rotate, said impeller and casing cooperating to pump said fluid and said thrust bearing having a lubricant-conducting path communicating from said lubricant-supplying means to a position between the confronting thrust bearing surfaces and intermediate the peripheries thereof, the surfaces of said thrust plate and collar being constructed and arranged to inhibit radial flow of lubricant and, on rotation of said thrust collar, to draw lubricant through said path between the confronting thrust bearing surfaces and to increase the pressure between the confronting bearing surfaces and in said well and thereby exert a supporting force on said shaft and supply lubricant under pressure to said journal bearings.

10. In a hermetically sealed motor pump unit for pumping a fluid, in combination, a rotor comprising an impeller and an elongated shaft, a sealed housing enclosing said rotor and having a fluid-tight well encasing an end portion of said shaft, a thrust bearing near the open end of said well for supporting the axial thrust of said shaft, said thrust bearing comprising a thrust plate mounted in said housing and a thrust collar mounted on said shaft, said thrust plate having a central opening the peripheral portion of which is hermetically sealed to said housing at the open end of said well, a pair of journal bearings located within said well at spaced points along said shaft for supporting the radial load of said shaft, means formed in said housing for supplying a lubricant to said thrust bearing, and electric motor means operable to apply a driving torque to said shaft at a point between said journal bearings, said motor means comprising an armature mounted on said shaft and an electrical field element mounted in said housing, said armature and said field element cooperating to rotate said shaft, and said impeller and casing cooperating to pump said fluid and said thrust bearing having a lubricant-conducting path connecting said lubricant-supplying means with the space between the confronting thrust bearing surfaces intermediate the peripheries thereof, the surfaces of said thrust plate and collar being constructed and arranged to inhibit radial flow of lubricant and, on rotation of said thrust collar, to draw lubricant through said path between the confronting thrust bearing surfaces and to increase the pressure between the confronting bearing surfaces and in said well and thereby exert an axial supporting force on said end portion of said shaft and supply lubricant under pressure to said journal bearings.

11. In a hermetically sealed motor pump unit for pumping a fluid, in combination, a rotor comprising an impeller and an elongated shaft, a sealed housing enclosing said rotor and having a well encasing said shaft, said impeller and said casing cooperating to pump said fluid as said shaft is rotated, a thrust bearing near the closed end of said well, said thrust bearing comprising a thrut plate mounted in said housing and having a recessed bearing surface and a rotatable plate mounted near one end of said shaft and having a plane bearing surface confronting said recessed bearing surface, said rotatable plate and thrust plate cooperating to define a central fluid-tight cavity communicating with the space between said bearing surfaces, means for supplying a lubricant to said well, said thrust plate having a lubricant-conducting path connecting said well with the space between the confronting surfaces of sad thrust and rotatable plates intermediate the peripheries thereof, said recessed bearng surface having peripheral non-recessed portions that inhibit radial lubricant flow and means for rotating said shaft whereby the recessed and non-recessed portions and the plane bearing surface cooperate to draw lubricant through said path between the confronting bearing surfaces and to increase the pressure between said bearing surfaces and within said cavity to assist said bearing surfaces in supporting the axial thrust of said shaft.

12. In a hermetically sealed motor blower unit for pumping a gas, in combination, a rotor comprising an impeller and an elongated shaft, a sealed housing enclosing said rotor and having a fluid-tight well encasing said shaft, a gas-lubricated thrust bearing adjacent the open end of said well, said thrust bearing comprising a thrust plate mounted in said housing and a thrust collar mounted on said shaft, said thrust plate having a central opening the peripheral portion of which is hermetically sealed to said housing at the open end of said well, a journal bearing located within said well for supporting the radial load of said shaft, means formed in said casing for conducting a portion of the gas pumped by said impeller to said thrust bearing to lubricate the same, and motor means for rotating said rotor, said thrust bearing having a lubricant-conducting path connecting said casing conducting means with the space between the confronting surfaces of said thrust plate and collar intermediate the peripheries thereof, the surfaces of said plate and collar being constructed and arranged to inhibit radial flow of lubricant and, on rotation of said thrust collar, to draw lubricant through said path between the bearing surfaces and to increase the gas pressure between the bearing surfaces and within said well, and thereby exert a supporting force on said shaft and supply lubricant gas under increased pressure to said journal bearing.

13. In a hermetically sealed motor blower unit for pumping a gas, in combination, a rotor comprising an impeller and an elongated shaft, a sealed housing enclosing said rotor and having a fluid-tight well snugly encasing said shaft, said impeller and said housing cooperating to pump said gas, a gas-lubricated thrust bearing adjacent the open end of said well, said thrust bearing comprising a thrust plate mounted in said housing and a thrust collar mounted on said shaft, said thrust plate having a central opening the peripheral portin of which is hermetically sealed to said housing at the open end of said well, a conduit formed in said housing for conducting a portion of the gas being pumped from the discharge of said impeller to said thrust bearing to lubricate said thrust bearing, said bearing having a lubricant-conducting path connecting said conduit and the space between the confronting surfaces of said thrust plate and collar intermediate the peripheries thereof a pair of journal bearings within said well at spaced points along said shaft for supporting the radial load of said shaft, and electric motor means for applying a driving torque to said shaft at a point between said journal bearings, said motor means comprising an armature mounted on said shaft and an electrical field element mounted in said casing outside said well, said armature and said field element cooperating to rotate said shaft, the confronting surfaces of said plate and collar having peripheral portions adapted to inhibit radial lubricant flow and being formed to draw lubricant from said conduit through said path between the confronting surfaces and to increase the gas pressure between the confronting surfaces and within said well, thereby exerting a supporting force on said shaft and supplying lubricant gas under increased pressure to said journal bearings.

* * * * *